Patented Mar. 5, 1946

2,395,907

UNITED STATES PATENT OFFICE 2,395,907

MANUFACTURE OF SIRUP

George T. Peckham, Jr., Clinton, Iowa, assignor to Clinton Company, Clinton, Iowa, a corporation of Iowa No Drawing. Application May 28, 1942, Serial No. 444,934

6 Claims. (Cl. 127—36)

This invention relates to the production of sirup made by a partial conversion of starch and particaly to sirups having a greater sweetness than has heretofore been customary in sirups having the same dextrose equivalent.

For many years sirups have been produced from starch by subjecting starch in the presence of moisture and heat, and generally under pressure to the hydrolyzing action of acids such as HCl. The conversion procedure employed in making these sirups is generally similar to that used in converting starch for the production of crystalline dextrose except that the conversion is not allowed to proceed as far. In sirup conversions the extent of the conversion will vary in accordance with the amount of reducing sugars desired by the customer for any particular commercial use of a sirup. During conversions, some of the starch is changed to dextrose, some to maltose, and the remainder to various dextrins and other intermediate products. In general the conversion is stopped before enough dextrose is formed to cause crystallization to take place after the sirup has been standing for a time. Sirups of a low degree of conversion (for example, below 45 D. E.) are bland and not particularly sweet. Sweeter sirups have been made heretofore having a dextrose equivalent of as high as 60 or slightly higher.

Heretofore in processes for making sirups of increased sweetness by means of higher acid conversions, two difficulties have been encountered: (1) the tendency for crystallization of dextrose in the finished product upon storage; and, (2) the development of a slight bitter flavor, usually attributed to reversion products resulting from the over-conversion of the sugars. For some commercial uses the slight bitter taste has been unobjectionable, but there are commercial uses and needs for which it is desirable to have the degree of sweetness attainable in the more highly converted sirups but in which the elimination of the bitter taste is essential.

In the past, a conventional method of making sirups from corn starch has been to combine an aqueous suspension of corn starch and a solution of HCl in a converter into which steam is introduced until there is attained a pressure which may vary from 30 to 40 pounds in accordance with the objectives or preference of the individual operator. The temperature at which conversion takes place may be varied by varying the steam pressure. Also the length of the treatment may be varied and the amount of acid may be varied to produce different degrees of conversion of starch into dextrose and other conversion products. When the conversion has been completed to the desired degree, the contents of the converter tank have generally been discharged into an open neutralizer tank where an alkali such as sodium carbonate is then added in such proportion as to raise the pH of the converter liquor from the neighborhood of about 2.0 to approximately the ultimate desired pH of the liquor, that is around 4.5 to 5.0 pH. It has been customary to add only the amount of alkali required for that change in pH and to add this alkali at such a time or at such a rate that the contents of the neutralizer tank are always maintained below 6 pH and usually below 5 pH. In order to produce sirups in the higher range of dextrose equivalents, such as 50% dextrose equivalent or higher, the extent of the conversion has been increased and regulated to accomplish that result, either by increasing the time element, the temperature, the amount of acid used, or any combination of these three factors. While increased conversion has increased the sweetness of such sirups, this desired result has heretofore invariably been accompanied by a slight bitterness in the finished sirup which is more pronounced the higher the conversion has been carried.

The greater sweetness produced in the higher dextrose equivalents has been a sufficient advantage in many industrial uses to more than offset the increased bitterness, as compared with the less sweet sirups which are more bland and have little noticeable bitterness. Efforts have been made in the past to counteract or eliminate this increased bitterness in the sweet sirups but numerous difficulties have been encountered.

The present invention provides an improved method of manufacturing non-bitter sirups with greater sweetness than is found heretofore in sirups of similar dextrose equivalents and made by prior processes. While the conventional technique of conversion practice with its variations is employed in this invention, I improve the sweetness of the final product by a new technique in the treatment of the converter liquor after conversion. I have found that after the usual acid conversion has been carried far enough, if the liquor thereafter be temporarily subjected to an alkaline treatment at a pH considerably above the final desired pH of the sirup a very noticeable improvement in the final sweetness is attained without attendant development of bitterness. I may accomplish this desired result in either of the two following ways.

After the liquor is discharged from the converter, while it preferably has a temperature ranging from 150° F. to boiling, I may add to it enough alkali, such as sodium carbonate, to produce a pH in the entire batch of liquor ranging from 7 to 9 and hold it in that pH range for a short time, such as 5 to 20 minutes, after which HCl is then added to reduce the pH to about 4.5 to 5.0, which is usually desirable in the final product. Following the reduction of the pH, clarification and finishing of the sirup according to conventional practices may then be followed, such as mechanical filtration to remove the suspended impurities, concentration under vacuum, treatment with activated carbon and a final mechanical filtration. After these refining steps have been completed, the sirup may be concentrated to whatever density is required by the market.

Another way to perform this invention is to convert the starch in the usual manner and after conversion neutralize it by adding the alkali gradually to the hot converter liquor in such a manner as to bring the pH of the liquor up from about 2.0, or whatever pH it has in the converter, to a final pH of 4.5 to 5.0, using just enough of the alkali to accomplish that result.

After this neutralization, the liquor may then be subjected to the usual mechanical filtration to remove suspended materials and then evaporated to about 28 to 30 Bé. At this point, an additional amount of alkali may be added to raise the pH to a range of about 7 to 9, where it is held for a few minutes. The liquor will then be restored to the usually desirable pH range of 4.5 to 5.0 by adding enough HCl to accomplish that result. The liquor thus temporarily subjected to an alkaline treatment and restored to final pH is then filtered and treated with carbon to the extent necessary to clarify it and remove the color, after which it may be evaporated to the final desired density of the sirup. Treatment of the converter liquor in this manner will also yield a sirup which will have a sweetness varying in accordance with the extent of the conversion but of greater sweetness than would normally be found in a sirup of the same degree of conversion and neutralized as was customary heretofore.

In short, the practice of the invention may be incorporated in the conventional method of sirup manufacture between any of the conventional steps after conversion and prior to final decolorization with activated carbon.

In view of the fact that the liquor may satisfactorily be subjected to an alkaline treatment at any temperature within a rather wide range of elevated temperatures such as 150° F. to boiling and since the existing temperature affects the speed of reaction the duration of the alkaline treatment should be controlled in accordance with the temperature, the criterion being to so regulate the temperature and the time of treatment as to produce in any given batch of sirup the desired result. As heretofore explained the desired result is to improve the sweetness of the final product over that which would be obtained in a sirup converted to the same extent but merely neutralized in accordance with prior practices. It may be noted that excessive treatment resulting from a combination of temperatures and time or even excess of alkali would darken the sirup more than is desirable and might through excessive reaction upon the sugars present defeat the real object of the treatment. Consequently to minimize darkening of the sirup and other effects of over-treatment the minimum amount of alkaline treatment required to bring about the desired improvement in the sweetness of the sirup will be utilized. With the foregoing directions at hand a careful operator skilled in the manufacture of starch conversion sirups will have no difficulty in attaining these desired results.

However, a typical example would be to adjust the pH to 7.5 and hold the sirup liquor at this pH at 180° F. for a period of 15 minutes, subsequently readjusting the pH to the desired 4.5 to 5.0 with HCl or other suitable acid. Numerical increases in pH, temperature and/or time will necessitate corresponding reductions in one or both of the other factors. pH may be varied between about 7.0 and 9.0; temperature may be varied between about 150° F. and boiling; and time may be varied from about 2 minutes to about 30 minutes.

It will be appreciated that in order to accomplish the results obtainable from the present invention to produce sweeter sirups than have been available on the market, the control factors in the acid conversion stage are subject to the usual variations and that variations in the alkaline treatment above recommended may be employed.

While sodium carbonate is mentioned as the alkali used in the foregoing example, other alkalis such as sodium hydroxide, potassium hydroxide, and potassium carbonate may be used in place of sodium carbonate.

While corn starch is named above it should be understood that this invention comprehends the use of any commercially obtainable starch, including starch obtained from potatoes, wheat, rice, cassava, or other suitable sources.

As this invention is concerned only with sweet, not bland, sirups, it will preferably be applied to starch liquors which have been converted by acid hydrolysis to well above 45% dextrose equivalent, preferably from 50% to 60%, or even higher. Thus the finished sirups after treatment in accordance with this invention will have a very definite sweetness and no noticeable bitterness.

The filtration and clarification practice does not form a part of this invention and is subject to such procedure as may be selected by the individual operator.

Having described my invention, I claim:

1. A process of manufacturing a starch conversion sirup of notable sweetness and no discernible bitterness comprising subjecting an aqueous starch suspension to acid hydrolysis until the liquor attains a dextrose equivalent analysis exceeding 50% but having less dextrose than would cause crystallization upon standing, neutralizing the liquor to about 5.0 pH, thereafter subjecting it to a treatment not substantially exceeding 30 minutes with an alkali selected from the group consisting of sodium carbonate, sodium hydroxide, potassium carbonate, and potassium hydroxide, between 7.0 pH and 9.0 pH, and subsequently restoring the liquor to about 5.0 pH by adding acid, and clarifying the liquor for use as a sirup, the alkaline treatment within the range of 7 to 9 pH being conducted at a temperature range of 150° F. to boiling.

2. A process comprising subjecting an aqueous starch suspension to acid hydrolysis until the solution attains a dextrose equivalent content of more than 50% but having less dextrose than would cause crystallization upon standing, subjecting the conversion solution to an alkaline treatment not substantially exceeding 30 minutes with an alkali selected from the group consisting of sodium carbonate, sodium hydroxide, potassium carbonate, and potassium hydroxide present in such proportion as to raise and hold the pH within a range of 7.0 to 9.0 pH, for a short time, thereafter reducing the pH to about 4.5 to 5.0 by adding acid, and clarifying the solution for use as a sirup, the alkaline treatment within the range of 7 to 9 pH being conducted at a temperature range of 150° F. to boiling.

3. A process comprising subjecting an aqueous starch suspension to acid hydrolysis to yield a dextrose equivalent content of more than 50% but insufficient to induce subsequent dextrose crystallization in the finished sirup product, subjecting the conversion solution to treatment not substantially exceeding 30 minutes with an alkali selected from the group consisting of sodium carbonate, sodium hydroxide, potassium carbonate, and potassium hydroxide in such proportion as to raise and hold the pH within a range of 7.0 to 9.0 pH for a short time, thereafter reducing the pH to about 4.5 to 5.0 by adding acid and clarifying and evaporating the solution to customary sirup clarities and densities, the alkaline treatment within the range of 7 to 9 pH being conducted at a temperature range of 150° F. to boiling.

4. In the manufacture of a starch conversion sirup the improvement consisting in converting an aqueous starch suspension by means of HCl until a dextrose equivalent analysis of over 50% is attained but having less dextrose than would cause crystallization upon standing, adding sodium carbonate to the converter liquor to raise the pH substantially to a range of 7.0 to 9.0 pH and after a period not substantially exceeding 30 minutes reducing the pH to about 4.5 to 5.0 or slightly below by adding HCl, the alkaline treatment within the range of 7 to 9 pH being conducted at a temperature range of 150° F. to boiling.

5. A process for manufacturing a noticeably sweet, non-crystallizing sirup through the acid conversion of starch which consists of incorporating in the conventional manufacturing procedure between the stages of conversion and final decolorization, a step consisting of the addition of sufficient alkali selected from the group consisting of sodium carbonate, sodium hydroxide, potassium carbonate, and potassium hydroxide to give a pH in the mixture of from about 7.0 to 9.0 and holding this mixture at a temperature ranging between 150° F. and boiling for a period of from about 2–30 minutes, thereafter neutralizing the excess alkalinity by the addition of acid to give a final pH of from about 4.5 to 5.0 and thereafter clarifying the liquor for use as a sirup.

6. A process for the manufacture of a noticeably sweet, non-bitter, non-crystallizing sirup from the acid hydrolysis of starch which consists in converting the starch to a D. E. of about 50–60, neutralizing with a suitable alkali to a pH of between 4.5 and 5.0, filtering out the suspended impurities, concentrating to about 28–30° Bé., warming to 160–180° F., adding sufficient alkali to increase the pH to 7.5, holding the mixture under these conditions for about 15 minutes, adding sufficient acid to again reduce the pH to about 4.5 to 5.0, and thereafter treating with activated carbon to further purify and decolorize the syrup, and finally concentrating to 41–45° Bé., the alkali employed as above being selected from the group consisting of sodium carbonate, sodium hydroxide, potassium carbonate, and potassium hydroxide.

GEORGE T. PECKHAM, JR.